(12) United States Patent
Atamna et al.

(10) Patent No.: US 8,583,597 B2
(45) Date of Patent: Nov. 12, 2013

(54) SYSTEM AND METHOD FOR ON-SITE MONITORING DATA ARCHIVAL

(75) Inventors: Youcef Atamna, Evans, GA (US); Eric Thomas Pool, Roswell, GA (US); Minh Ngoc Huynh, Virginia Beach, VA (US); Shawn Christopher Sproule, Virginia Beach, VA (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 13/298,276

(22) Filed: Nov. 16, 2011

(65) Prior Publication Data
US 2013/0124469 A1    May 16, 2013

(51) Int. Cl.
*G06F 15/16*    (2006.01)
*G06F 17/00*    (2006.01)

(52) U.S. Cl.
USPC ............................................ 707/634; 709/247

(58) Field of Classification Search
CPC .................................................... G06F 19/327
USPC ..................... 707/613, 693, 634; 709/247
See application file for complete search history.

(56) References Cited

U.S. PATENT DOCUMENTS

| | | | |
|---|---|---|---|
| 6,262,550 B1 * | 7/2001 | Kliman et al. | 318/565 |
| 6,499,114 B1 * | 12/2002 | Almstead et al. | 714/25 |
| 6,741,919 B1 * | 5/2004 | Schuster et al. | 701/29.4 |
| 6,839,003 B2 * | 1/2005 | Soliman et al. | 341/50 |
| 6,906,630 B2 * | 6/2005 | Georges et al. | 340/646 |
| 7,013,203 B2 * | 3/2006 | Moore et al. | 700/286 |
| 7,272,179 B2 * | 9/2007 | Siemens et al. | 375/240.01 |
| 2003/0120619 A1 * | 6/2003 | Osborn | 706/19 |
| 2004/0199669 A1 * | 10/2004 | Riggs et al. | 709/242 |

OTHER PUBLICATIONS

U.S. Appl. No. 13/298,281, filed Nov. 16, 2011, Youcef Atamna.

* cited by examiner

*Primary Examiner* — Jorge A Casanova
(74) *Attorney, Agent, or Firm* — Fletcher Yoder, P.C.

(57) ABSTRACT

In an embodiment, a system includes an on-site monitoring (OSM) data archival portion having one or more sensors configured to monitor a machine and generate corresponding monitoring data. The system also includes an on-site monitoring (OSM) archiver configured to receive and store the monitoring data collected by the one or more sensors. The system further includes an export service configured to export a portion of the monitoring data from the OSM archiver into one or more compressed files. The system also includes an export background intelligent transfer service (BITS) configured to establish a secure connection and send the one or more compressed files to an off-site location.

23 Claims, 7 Drawing Sheets

SYSTEM AND METHOD FOR ON-SITE MONITORING DATA ARCHIVAL

BACKGROUND OF THE INVENTION

The subject matter disclosed herein relates generally to industrial equipment monitoring and diagnostics and, more specifically, to the archival of monitoring data.

Certain systems, such as an industrial control system, may include capabilities that enable the control and monitoring of the industrial control system. For example, the industrial control system may include controllers, field devices, and sensors storing monitoring data for subsequent analysis. On-site archival systems may be used to store the monitoring data that is collected. It may, in certain circumstances, be desirable to transfer a portion of this archived monitoring data to an off-site location (e.g., a central monitoring location). However, the security constraints of certain industrial control systems (e.g., power stations) may significantly restrict how communication channels may be formed between on-site and off-site locations such that the monitoring data may be transferred.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an on-site monitoring (OSM) data archival portion having one or more sensors configured to monitor a machine and generate corresponding monitoring data. The system also includes an on-site monitoring (OSM) archiver configured to receive and store the monitoring data collected by the one or more sensors. The system further includes an export service configured to export a portion of the monitoring data from the OSM archiver into one or more compressed files. The system also includes an export background intelligent transfer service (BITS) configured to establish a secure connection and send the one or more compressed files to an off-site location.

In a second embodiment, a method includes monitoring the operation of one or more machines using one or more controllers. The method also includes storing monitoring data received from the one or more controllers in an on-site monitoring (OSM) archiver. The method also includes exporting a portion of the monitoring data from the OSM archiver into one or more compressed files. The method further includes establishing an asynchronous communication channel to a central site and sending the one or more compressed files to the central site via the asynchronous communication channel.

In a third embodiment, a non-transitory, computer-readable medium stores instructions executable by a processor of one or more electronic devices, and the instructions include instructions to pack a portion of monitoring data for a machine from an on-site monitoring (OSM) archiver into one or more files and instructions to establish an asynchronous background intelligent transfer service (BITS) communication channel and send the one or more files to a central site via the BITS communication channel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
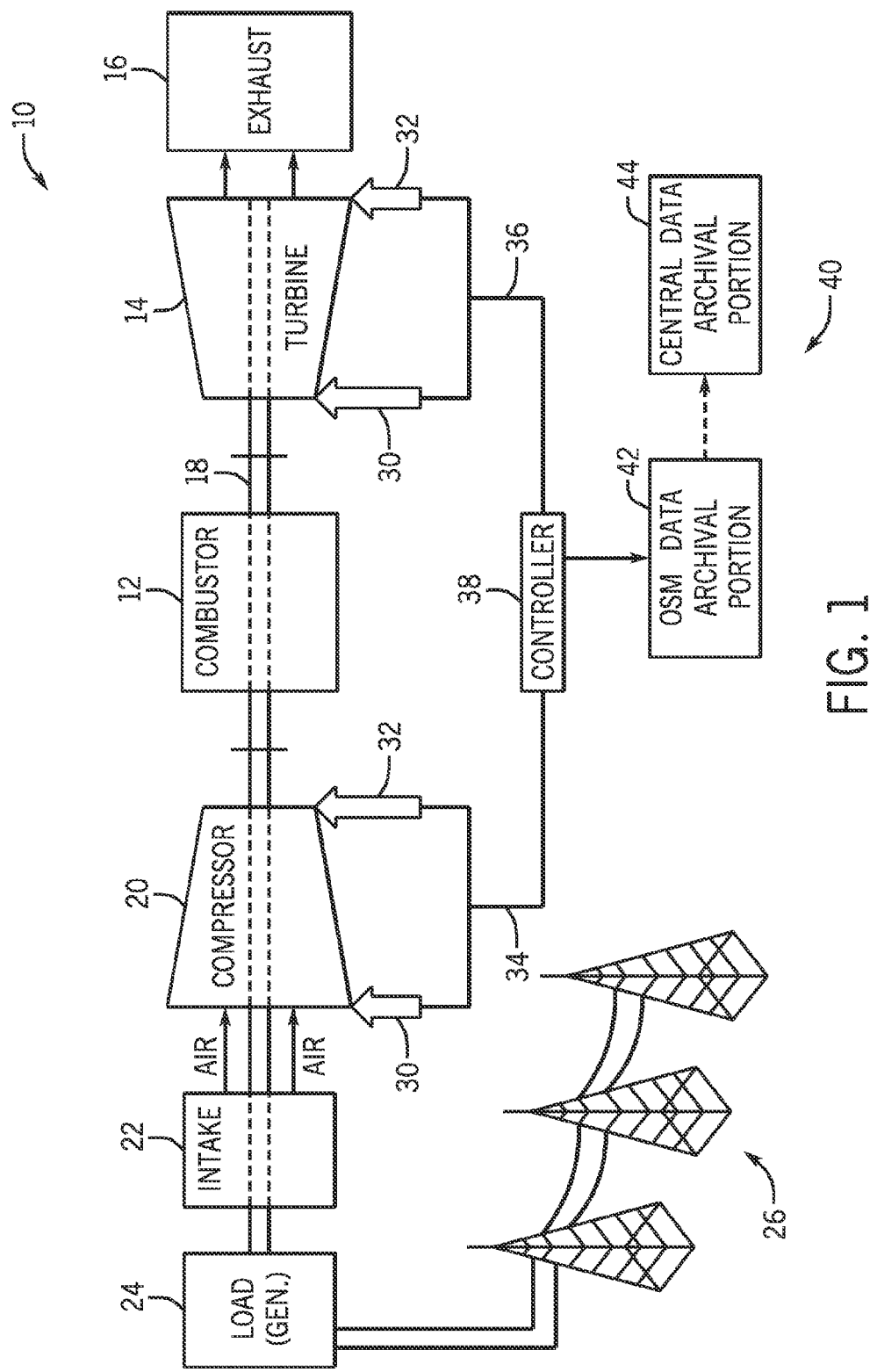
FIG. 1 is a block diagram of an embodiment of an industrial control system, including a controller.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. It should also be appreciated that the term "archive" is presently used to describe a collection of files (e.g., a .zip archive, a .rar archive, etc.) that are packed, and potentially compressed, into a single file.

Industrial control systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark™ VIe controller system, available from General Electric Co., of Schenectady, N.Y., data from components of the industrial control system may be stored in a database system for subsequent analysis and processing. For example, temperature, pressure, flow rate, clearance (e.g., distance between two components) and vibration data of turbomachinery (e.g., gas turbine, steam turbine, compressor, pump) may be used to derive trends, activate alarms, and more generally, to provide for indications of performance of the turbomachine.

In such industrial control systems, a substantial amount of on-site monitoring (OSM) data may be collected regarding the operation of the various components of the control system. As such, an OSM data archiver may be used to archive this data on-site so that it may be processed and used. However, in certain situations, it may be desirable to, additionally or alternatively, store the OSM data at a central monitoring location, which may serve as a central repository to store the OSM data collected at a number of different OSM locations. This allows for greater trend analysis (e.g., output trends, maintenance trends, or financial trends, etc.) of the OSM data across multiple OSM locations. For example, the power output of similar power stations in geographically diverse areas may be compared by accumulating and analyzing the OSM data from multiple locations.

However, industrial control systems typically have substantially network security constraints in place to prevent unauthorized access of the control systems and its associated machinery. Since an OSM data archival system may be coupled to one or more controllers of an industrial control system, forming typical communication channels (e.g., TCP/IP sockets) into the OSM network from outside the network may be prohibited (e.g., via firewall policy). As such, the disclosed embodiments enable the establishment of a secure, asynchronous communication channel that is initiated from an OSM location to a central monitoring location. For example, in certain embodiments, an asynchronous background intelligent transfer service (BITS) communication channel may be used to transfer OSM data between an OSM data archival system to a central monitoring data archival system. Generally speaking, the disclosed embodiments enable the secure transfer of OSM data to the central monitoring location in a robust manner using low-bandwidth connections (e.g., modem connections or idle bandwidth). As presented below, the disclosed embodiments generally enable the resuming of operations after interruption, prioritization of the transfer of certain OSM data, and gracefully handling of error conditions.

With the foregoing in mind, FIG. 1 illustrates a gas turbine system 10 as an example embodiment of an industrial control system that incorporates techniques disclosed herein. As depicted, the turbine system 10 may include a combustor 12, which may receive a fuel/air mixture for combustion. This combustion creates hot, pressurized exhaust gases, which the combustor 12 directs through a turbine 14 (e.g., part of a rotor) and toward an exhaust outlet 16. As the exhaust gases pass through the turbine 14, the resulting forces cause the turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 may cause the shaft connecting the turbine 14 to the compressor 20 to rotate the blades within the compressor 20. The rotation of blades in the compressor 20 compresses air that is received via an air intake 22. The compressed air is fed to the combustor 12 and mixed with fuel to allow for higher efficiency combustion. The shaft 18 may also be connected to a load 24, which may be a vehicle or a stationary load, such as an electrical generator in a power plant or a propeller on an aircraft. When the load 24 is an electrical generator, the electrical generator may be coupled to a power grid 26 for distributing electrical power to, for example, residential and commercial users.

The turbine system 10 may also include a plurality of sensors and field devices configured to monitor a plurality of engine parameters related to the operation and performance of the turbine system 10. The sensors and field devices may include, for example, inlet sensors and field devices 30 and outlet sensors and field devices 32 positioned adjacent to, for example, the inlet and outlet portions of the turbine 14, and the compressor 20, respectively. The inlet sensors and field devices 30 and outlet sensors and field devices 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, and a geometry position of variable geometry components (e.g., air inlet).

The plurality of sensors and field devices 30 and 32 may also be configured to monitor engine parameters related to various operational phases of the turbine system 10. Measurements taken by the plurality of sensors and field devices 30 and 32 may be transmitted via module lines 34 and 36, which may be communicatively coupled to a controller 38. The controller 38 may use the measurements to actively control the turbine system 10. Further, the controller 38 and/or the sensors and field devices 30 and 32 may store the measurements in an OSM data archival system, as described in more detail below with respect to FIG. 2. For example, module line 34 may be utilized to transmit measurements from the compressor 20, while module line 36 may be utilized to transmit measurements from the turbine 14. It should be appreciated that other sensors may be used, including combustor 12 sensors, exhaust 16 sensors, intake 22 sensors, and load 24 sensors. Likewise, any type of field devices may be used, including "smart" field devices such as Fieldbus Foundation, Profibus, and/or Hart field devices. It is also to be appreciated that the gas turbine system 10 is only an example embodiment of turbomachinery, and that other gas turbine systems may include, for example, multiple turbines, multiple shafts, and other arrangement of system 10 components. Alternatively, the turbomachine may not be a gas turbine system 10, but may be a steam turbine, a hydroturbine, or a wind turbine.

Figure 2:
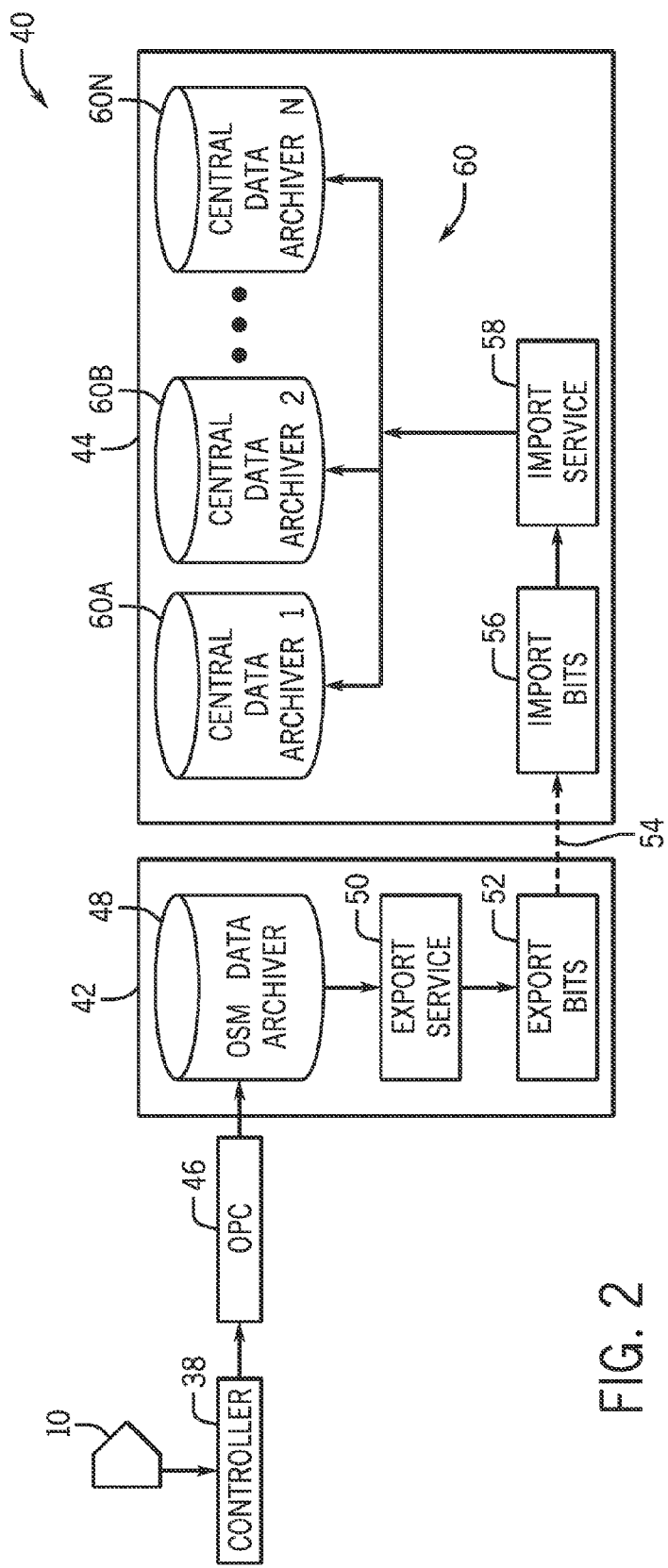
FIG. 2 is a block diagram of an embodiment of monitoring data archival system.

As mentioned above, an industrial control system may use a data archival system suitable for storing the OSM data. Turning to FIG. 2, a data archival system 40 is illustrated, which includes an OSM data archival portion 42 (e.g., at the OSM location) and a central monitoring data archival portion 44 (e.g., at a central monitoring location). As depicted in FIG. 2, OSM data archival portion 42 generally receives monitoring data from an industrial control system 10 (e.g., turbine system 10). As discussed in detail below, the OSM data archival portion 42 generally packages portions of the OSM data and sends it to the central monitoring data archival portion 44.

The OSM data collected by the OSM data archival portion 42 may include parameters of the industrial control system 10, such as temperature, pressure, flow rate, vibration, and clearance data. In the depicted embodiment, the OSM data is collected via the controller 38 (e.g., using sensors and field devices 30 and 32 of FIG. 1). Additionally, in the depicted embodiment, an open process control (OPC) system 46 (e.g., a General Electric Cimplicity™ OPE server) communicatively couples the controller 38 with an OSM data archiver 48, allowing for data to be exchanged between the controller 38 into the OSM data archiver 48. The data gathered by the OPC system 46 may include data captured at a variety of time frames or resolutions. For example, the data may be captured at every millisecond, every 500 milliseconds, every second, every 10 seconds, every hour, and/or every day.

The OSM data archiver 48 may be any database, storage, or archiver system. For example, the OSM data archiver 48 may include a relational database (e.g., Oracle, Microsoft SQL Server, MySQL, PostgreSQL), a network database (e.g., CODASYL, TurboIMAGE), an iHistorian data archiver, an LDAP database, a file, a noSQL database (e.g., BaseX, Apache CouchDB, SimpleDB), or any other type of data storage. Further, the OSM data archiver 48 may store data from any number of industrial control systems 10. Indeed, the OSM data archiver 48 may be communicatively coupled to a plurality of turbine systems 10, and be used as the data repository for the plurality of turbine systems 10 (e.g., multiple turbine systems 10). By aggregating data from one or more turbine systems 10, the OSM data archiver 48 may be used to analyze individual turbine systems 10 or a group of turbine systems 10.

Additionally, the illustrated OSM data archival portion 42 includes an export service 50. The export service 50 may be executed as one or more threads on one or more processors located at the OSM location. As discussed in detail below, the export service 50 generally receives portions of OSM data from the OSM data archiver 48, and packages the data into one or more archive files for transport. In certain embodiments, the export service 50 may compress the monitoring data to reduce the volume of data to be transferred. Furthermore, as discussed below, the export service 50 may be configured to package monitoring data collected over various time intervals (e.g., over a most recent time interval or over a specified, previous time interval).

Additionally, the illustrated OSM data archival portion 42 includes an export background intelligent transfer service (BITS) 52. The export BITS 52 may be executed as one or more threads by one or more processors located at the OSM location. For example, in certain embodiments, the export service 50 and the export BITS may be executed on or by the same processor. As discussed in detail below, the export BITS 52 establishes an asynchronous communication channel 54 to the central monitoring data archival system 60 and transfers the OSM data, as packaged by the export service 50, to the central monitoring data archival system 60. In certain embodiments, the communication channel 54 may be encrypted. Additionally, in certain embodiments, the communication channel 54 may be a low-bandwidth communication channel (e.g., a modem, ISDN, or RF data connection or idle bandwidth). Furthermore, in certain embodiments, the communication channel 54 may be implemented as a one-way data connection between the OSM data archival portion 42 and the central monitoring data archival portion 44. However, in certain embodiments, the communication channel 54 may be a two-way, allowing the export BITS to retrieve updates (e.g., updated configuration files or scripts) from the central monitoring location 44.

Complimentary to the illustrated OSM data archival portion 42, the illustrated central monitoring data archival portion 44 includes an import background intelligent transfer service (BITS) 56 and an import service 58. Generally speaking, the import BITS 56 may accept the communication channel 54 established by the export BITS 52 of the OSM data archival portion 42, and may receive one or more archive files containing OSM data from the export BITS 52. In certain embodiments, the communication channel 54 may be a two-way channel, and the import BITS 56 may provide the export BITS 52 with updates (e.g., updated configuration files or scripts) upon request. Furthermore, the export BITS 52 (along with the import BITS 56) may be generally configured to resume BITS jobs at the point in which they have been interrupted such that minimal redundant data may be sent over the communication channel 54. Once the files containing the OSM data have been received by the import BITS 56, the import service 58 may process the files to extract the OSM data. In certain embodiments, the received OSM data may be packaged into archive files and compressed. As discussed, the import service 58 may decompress or otherwise unpack the one or more files, if needed, and then parse the OSM data contained within to prepare it for storage by one or more central data archivers 60 (e.g., 60A, 60B, or 60N).

The central data archivers 60 (e.g., archiver 60A, 60B, or 60N) may be any number of database, storage, or archiver systems. For example, the central data archivers 60 may include relational databases (e.g., Oracle, Microsoft SQL Server, MySQL, PostgreSQL), network databases (e.g., CODASYL, TurboIMAGE), an iHistorian data archiver, a Proficy data archiver, an LDAP database, a file, a noSQL database (e.g., BaseX, Apache CouchDB, SimpleDB), or any other type of data storage. Further, the central data archivers 60 of the central monitoring data archival portion 44 may store monitoring data from any number of OSM data archival portions 42. By aggregating data from multiple OSM data archival portions 42, the data stored in the central data archivers 60 may be analyzed to compare any number of industrial control systems 10 (e.g., tubine systems 10) within a fleet. The use of multiple central data archivers 60 (e.g., archiver 60A, 60B, or 60N) enables a more scalable and robust central monitoring data archival portion 44. That is, additional central data archivers 60 may be added as data loads increase, and various load balancing database algorithms may be used to more efficiently distribute queries and/or data updates among the data archivers 60.

Figure 3:
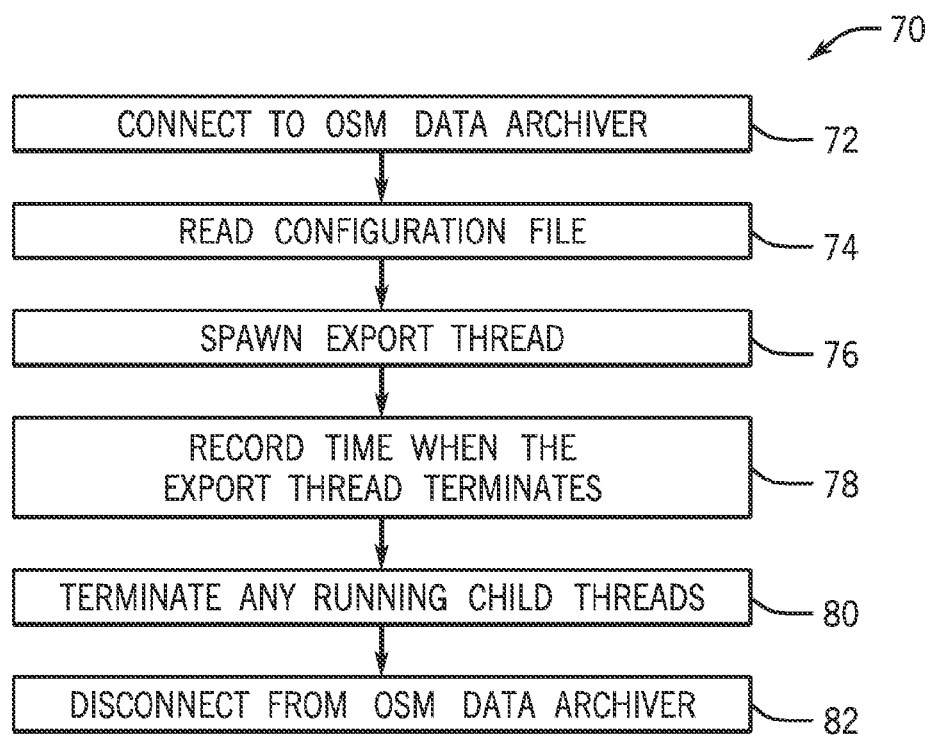
FIG. 3 is a flow diagram illustrating an embodiment of an export process for the on-site monitoring (OSM) portion of the monitoring data archival system.

As mentioned, the export service 50 of the OSM data archival portion 42 of the system is generally responsible for receiving data from the OSM data archiver 48 and packaging this data such that the export BITS 52 may transfer the data to the central monitoring data archival portion 44. Turning to FIG. 3, an embodiment of a process 70 is presented by which the export service 50 may perform these actions. The process 70 begins with the export service 50 connecting (block 72) to the OSM data archiver 48. For example, in certain embodiments, the export service 50 may connect to an iHistorian OSM data archiver 48. Once connected, the export service 50 may read (block 74) one or more configuration files from the OSM data archiver 48. Generally speaking, one or more the configuration files may contain a plurality of parameters that define the behavior of the export service 50. For example, the one or more configuration files may include login credentials for an OSM data archiver 48, various file paths to be used in the export and packaging of the OSM data, an amount of time to wait between executions of the export service 50, or similar parameters. In certain embodiments, the one or more configuration files may include a task list including specified time intervals for which the OSM data should be exported and packaged.

After downloading the configuration files, the export service 50 may spawn an export thread, which is described in detail below with respect to FIG. 4. Once the export thread has terminated, the export service 50 may record the time such that the export service 50 may be able to determine when the export thread was last executed. As discussed below, this information may be used by the export thread to determine what data should be packaged for transport. Furthermore, as discussed below, the export thread may spawn one or more child threads for completing the various steps in packaging the OSM data for transport. As such, once the export thread has terminated, the export service 50 may also terminate (block 80) any child threads of the parent export thread. Finally, the export service 50 may disconnect (block 82) from the OSM data archiver 42 prior to termination. It should be noted that, in certain embodiments, the process 70 may be executed by one or more processors at the OSM location at regular time intervals. That is, in certain embodiments, the export service 50 may be executed monthly, weekly, daily, nightly, hourly, or with even greater frequency. It should also be noted that various error handling routines may be implemented such that the failure to complete a step in the process 70 may result in subsequent repetition of the failed action, logging of the failed action, and graceful termination as appropriate.

Figure 4:
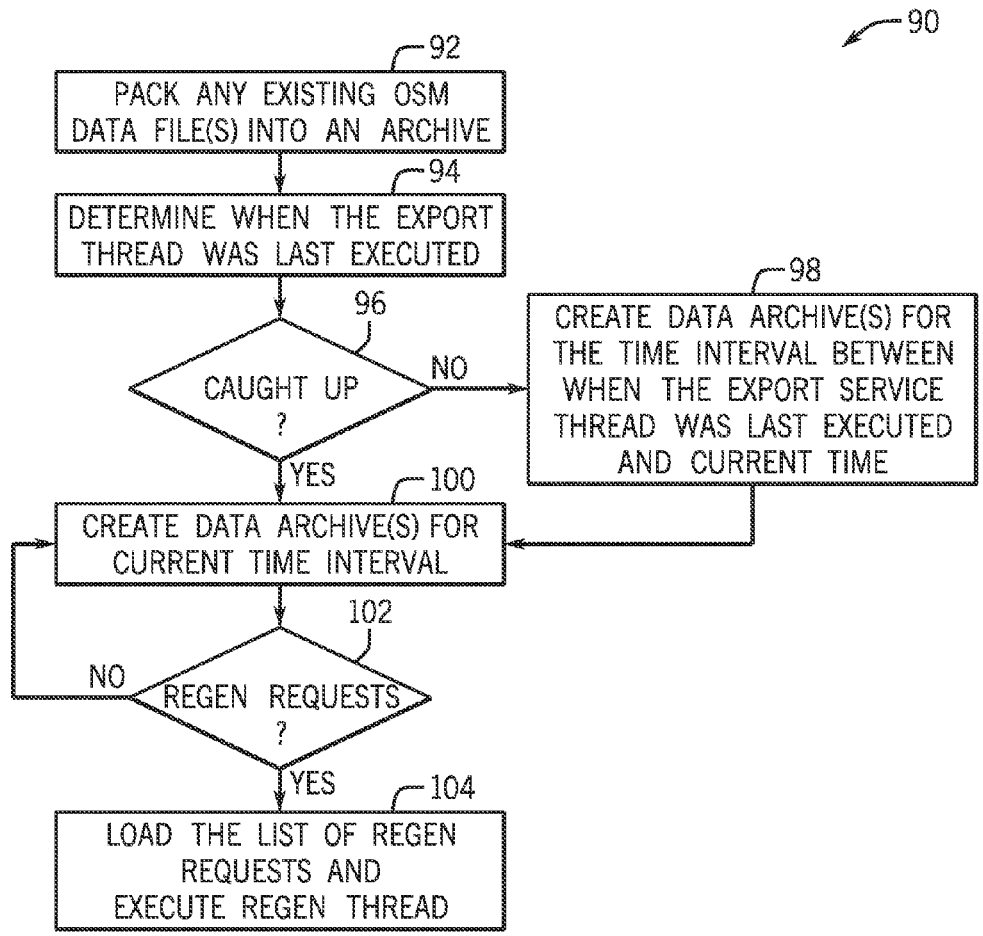
FIG. 4 is a flow diagram illustrating an embodiment of an export thread process for the OSM portion of the monitoring data archival system.

FIG. 4 illustrates an embodiment of the export thread process 90 represented by block 76 of FIG. 3. As illustrated in FIG. 4, the export thread process 90 may begin by packing (block 92) any existing OSM data files into an archive file. That is, if the execution of the export thread process 90 was previously interrupted, one or more OSM data files may be assessable by the export thread for compression when the export thread process 90 is restarted. In certain embodiments, the export thread may also compress the archive prior to proceeding.

Next, the export thread may determine (block 94) when the export thread was last executed. In certain embodiments, the export thread may determine when it was last executed by checking the value of a particular register, memory space, file, or other resource at the OSM location. Then, the export thread may determine (block 96) if it is caught up on exporting OSM data. That is, the export thread may determine that it was previously executed at its expected time, or determine that it is behind on exporting OSM data to the central monitoring location 44. As such, if the export thread is not caught up, then the export thread may create (block 98) one or more data archives for the time interval between when the export service was last executed and the current time, for example, using the data archival process described in FIG. 5. If, however, the export thread determines that it is caught up, then the export thread may create (block 100) one or more data archives for the current time interval, for example, using the data archival process described in FIG. 5. For example, the export thread may be configured to define the current time interval to include OSM data collected during the most recent 1 minute, 5 min., 10 min., 15 min., 30 min., one hour, six hours, 12 hours, 24 hours, 36 hours, etc.

After creating the appropriate data archives for current and/or previous time intervals, the export thread may determine (block 102) if one or more regeneration (REGEN) requests are present. Generally speaking, a REGEN request is a request to repackage and resend a specified portion of OSM data. For example, if central monitoring data archival portion 44 fails to receive the OSM data for a particular time interval (e.g., due to an interruption in the connection 54), then the central monitoring data archival portion 44 may create a REGEN request to have OSM data archival portion repackage and resend the specified portion of the OSM data. If, the export thread determines that there are no REGEN requests, then the export thread may resume creating (block 100) data archives for the current time interval. However, if the export thread determines that one or more REGEN request are present, then the export thread loads (block 104) the list of REGEN request and may spawn one or more REGEN child threads to create data archives to satisfy the REGEN requests. An example embodiment of a REGEN thread process is described with respect to FIG. 6.

Figure 5:
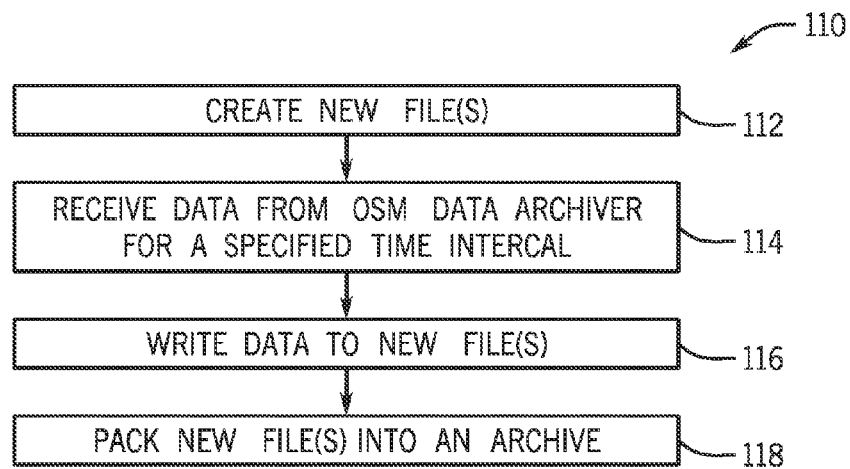
FIG. 5 is a flow diagram illustrating an embodiment of data archival process for the OSM portion of the monitoring data archival system.

FIG. 5 illustrates an embodiment of data archival process 110 for constructing OSM data archives for specified time interval. That is, regardless of whether the OSM data to be packaged is OSM data collected over the current time interval (e.g., block 100) or OSM data from a previous time interval (e.g., block 98 or 104) the OSM data archives may be constructed in a similar manner. The data archival process 110 may begin with the creation (block 112) of one or more new files to serve as containers for the OSM monitoring data. For example, one or more text files, comma-separated value files, or Excel spreadsheet files may be created.

The data archival process 110 may receive data from the OSM data archiver for a specified time interval (e.g., a current time interval or a previous time interval). In certain embodiments, the data archival process 110 may query and pull OSM data archiver 48 to retrieve data for the specified time interval. In other embodiments, the OSM data archiver 48 may instead push OSM data to the data archival process 110 for the specified time interval. Regardless, once the OSM data for the specified time interval has been received, the data archival process 110 may write (block 116) the OSM data to the new files. In certain embodiments, the new OSM data files may be created at the same time as they are populated. Finally, in the illustrated embodiment, the data archival process 110 may pack (block 118) the one or more new OSM data files into an archive file. Furthermore, in certain embodiments, the data archival process 110 may also compress the archive file to further reduce its size and/or encrypt the file for additional security.

Figure 6:
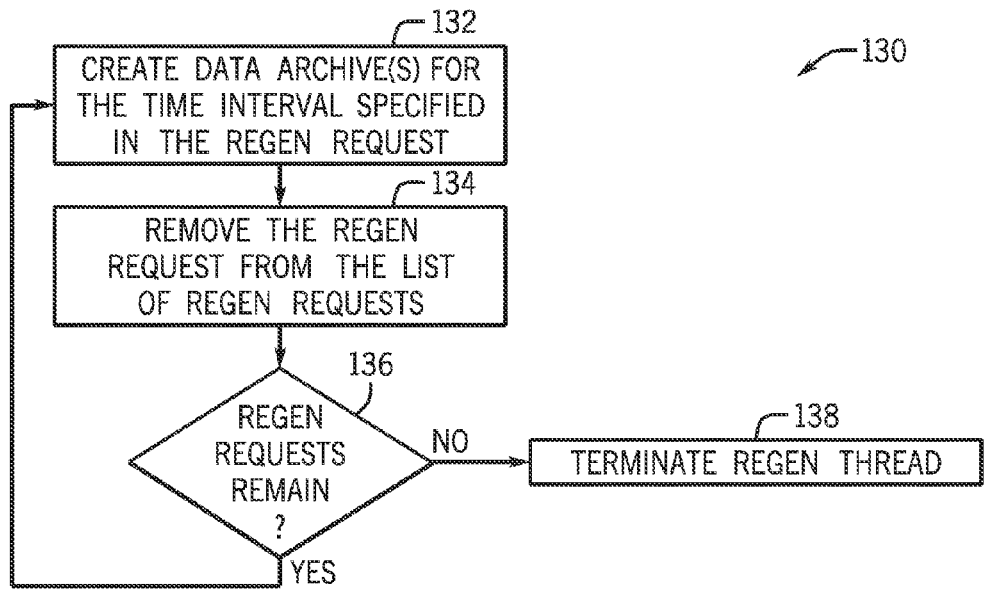
FIG. 6 is a flow diagram illustrating an embodiment of regeneration (REGEN) thread process for addressing regeneration requests for the OSM portion of the monitoring data archival system.

FIG. 6 illustrates an embodiment of a REGEN thread process 130 mentioned in block 104 of FIG. 4. The illustrated REGEN thread process 130 begins with the creation (block 132) of one or more data archives for the time interval specified in the REGEN request, for example, using the data archival process 110 described in FIG. 5. After creating the archives, the REGEN thread may remove (block 134) the REGEN request from the list of REGEN request, and then determine (block 136) if any REGEN requests remain. If no REGEN requests remain, then the REGEN thread may be terminated (block 138). If, however, one or more REGEN request remain, then the region thread creates (block 132) a data archive for the time interval specified in the subsequent REGEN request, and continues the process.

Figure 7:
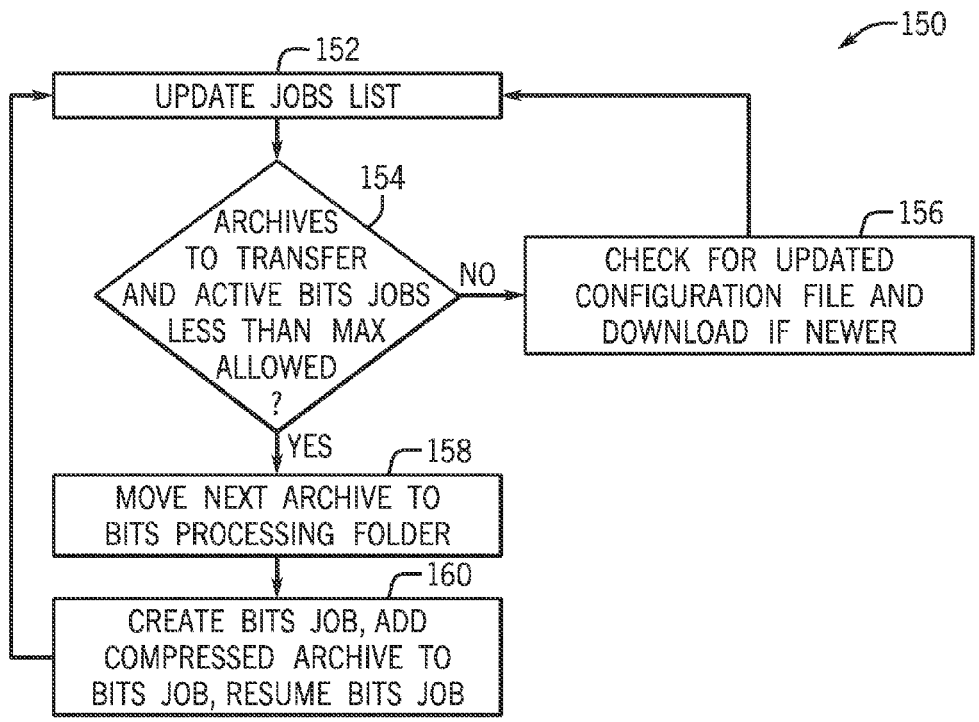
FIG. 7 is a flow diagram illustrating an embodiment of export background intelligent transfer service (BITS) data process for the OSM portion of the monitoring data archival system.

The export BITS 52 may execute an export BITS process 150 as illustrated by the embodiment depicted in FIG. 7. In the illustrated embodiment, the BITS process 150 begins by updating (block 152) the BITS jobs list. For example, the export BITS 52 may remove any BITS jobs from the BITS jobs list that have been successfully transferred to the central monitoring data archival portion 44. Additionally, the export BITS 52 may remove any BITS jobs that terminated in an error condition (e.g., if the connection 54 is interrupted).

Next, the export BITS 52 may determine if (block 154) there are archives to transfer and that the number of active BITS jobs is less than the max number of BITS jobs allowed. If there are no more archives to transfer or if no more BITS jobs are allowed, the export BITS 52 may check (block 156) for an updated configuration file from the central monitoring location and download the configuration file if it is newer than a configuration file used by the OSM data archival portion 42. If, however, there remain archives to be transferred and remaining slots for new BITS jobs are available, then the export BITS 52 may move (block 158) the first of the remaining archives to a folder or directory for processing. Subsequently, the export BITS 52 may create (block 160) a BITS job for the archive, add the archive to the created BITS job, and then begin/resume the BITS job. Then, the export BITS 52 may once again update (block 152) the BITS job list and repeat the process.

Figure 8:
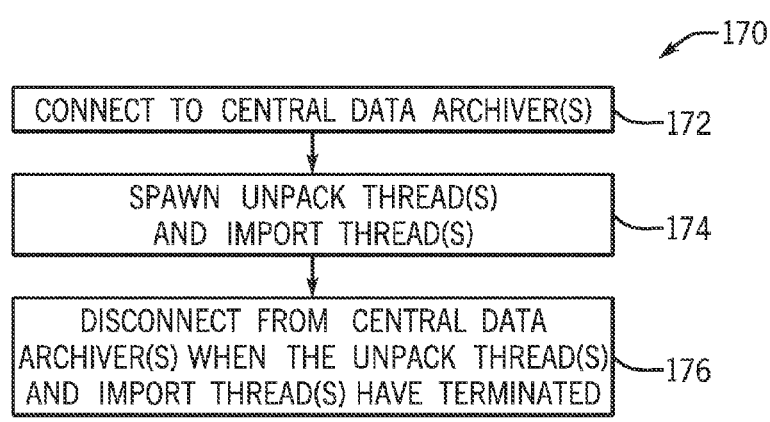
FIG. 8 is a flow diagram illustrating an embodiment an import process for the central monitoring portion of the monitoring data archival system.

At the central monitoring location, the import service 58 of the central monitoring data archival portion 44 may execute an import process 170 as illustrated in the embodiment of FIG. 8. The illustrated import process 170 begins with the import service 58 connecting (block 172) to one or more central data archivers 60. Once connected, the import service 58 may spawn (block 174) one or more unpack threads (which may execute a process similar to the embodiment illustrated in FIG. 9) as well as one or more import threads (which may execute a process similar to the embodiment illustrated in FIG. 10), as discussed below. Then, (e.g., after the unpack and import threads have terminated) the import service 58 may disconnect (block 176) from the central data archivers 60. It should be noted that, in certain embodiments, the process 170 may be executed by one or more processors at the central monitoring location at regular time intervals. That is, in certain embodiments, the import process 170 may be executed monthly, weekly, daily, nightly, hourly, or with even greater frequency. It should also be noted that various error handling routines may be implemented such that the failure to complete a step in the import process 170 may result in subsequent repetition of the failed action, logging of the failed action, and graceful termination as appropriate.

Figure 9:
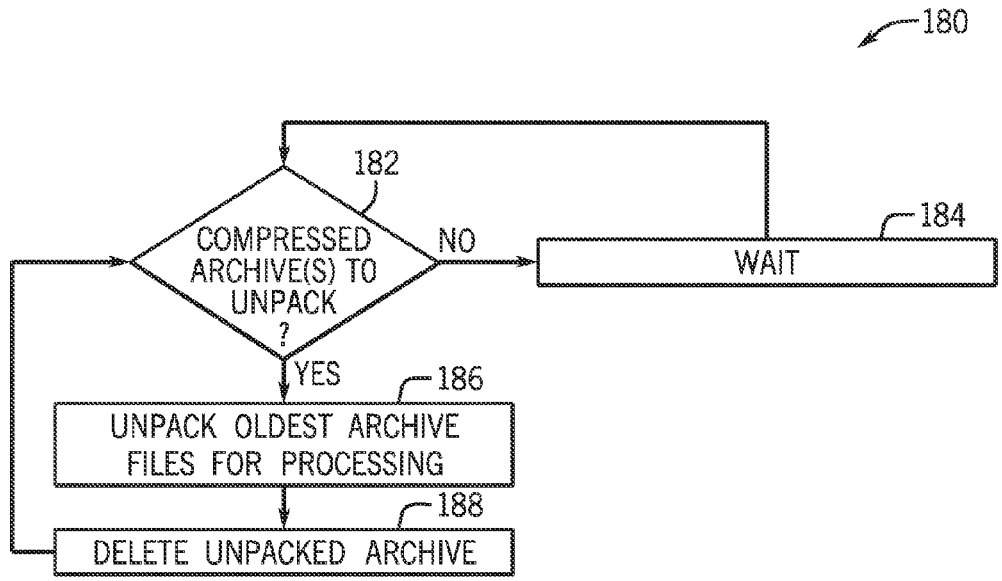
FIG. 9 is a flow diagram illustrating an embodiment an unpacking thread process for the central monitoring portion of the monitoring data archival system.

FIG. 9 illustrates an embodiment of a unpack thread process 180 mentioned in block 174 of FIG. 8. In the illustrated unpack thread process 180, the import service 58 may determine if (block 182) one or more archives are available to unpack. In certain embodiments, as the import BITS 56 receives the archives from the export BITS 52 of the OSM data archival portion 42, the import BITS 56 may place the received OSM data archives in a particular folder or directory that is accessible to the import service 58 (as well as child unpack and import threads). In such an embodiment, the import service 58 may check the particular folder to determine if there are any archives to unpack. If no archives are present, the unpack thread may wait (block 184) a predetermined amount of time (e.g., 1 min., 15 min., 30 min., 1 hour, etc.) before checking once again (block 182). When archives are present to process, the unpack thread may unpack (blocks 188) files contained within the oldest archive for processing. In certain embodiments, unpacking the archives may involve decompressing, unencrypting, or otherwise translate the contents of the archive. Subsequently, the unpack thread may check for another archive to unpack (block 182) and resume the process.

Figure 10:
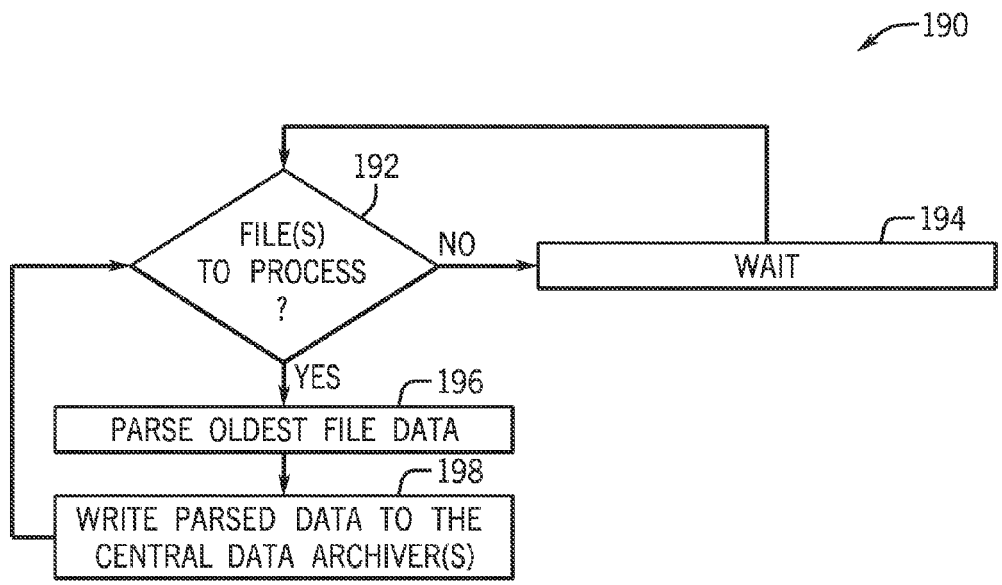
FIG. 10 is a flow diagram illustrating an embodiment an import data process for the central monitoring portion of the monitoring data archival system.

In certain embodiments, when the unpack thread unpacks the OSM data files for processing, as described in block 186 of FIG. 9, the unpacked files may be placed in a directory that is assessable to the import thread. FIG. 10 illustrates an embodiment of the import thread process 190 mentioned in block 174 of FIG. 8. The illustrated import thread process 190 begins with the import thread determining if (block 192) one or more unpacked files are present for processing. If no files are present to process, the import thread may wait (block 194) a predetermined amount of time (e.g., 1 min., 15 min., 30 min., 1 hour, etc.) before checking once again (block 192). If, however, one or more files are present to process, then the import thread parses (block 196) the oldest unpacked file to extract the OSM data contained within. Then, the import thread may write (block 198) the parsed data to the central data archivers 60. Subsequently, the import thread may check for another file to process (block 198) and resume the process once more.

Technical effects of the invention include enabling the establishment of a secure, asynchronous communication channel that is initiated from an OSM location to a central monitoring location. The disclosed embodiments enable the secure transfer of OSM data to the central monitoring location in a robust manner in a manner that enables the resuming of data transfer and packaging operations after interruption, prioritization of the transfer of certain OSM data, and gracefully handling of error conditions. Furthermore, the disclosed embodiments enable the efficient use of low-bandwidth connections (e.g., modem connections or idle bandwidth) by enabling the automatic compression and decompression of the OSM data. Additionally, by aggregating data from multiple OSM data archival portions, the data stored in the central monitoring data archival portion may be analyzed to compare any number of industrial control systems within a fleet.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
one or more sensors configured to monitor a machine and generate corresponding monitoring data; and
an on-site monitoring (OSM) data archival portion including a processor configured to execute:
an on-site monitoring (OSM) archiver configured to receive and store the monitoring data collected by the one or more sensors;
an export service configured to export a portion of the monitoring data from the OSM archiver into one or more compressed files, wherein the export service comprises one or more threads configured to be executed on the processor, and wherein the processor is configured to determine a time of execution for each of the one or more threads, and to generate a data archive of the portion of the monitoring data collected over a first time interval or over a second time interval based at least in part on whether the time of execution corresponds to an expected time for exporting the portion of the monitoring data; and
an export background intelligent transfer service (BITS) configured to establish a secure connection and send the one or more compressed files to an off-site location.

2. The system of claim 1, comprising:
a central monitoring data archival portion located at the off-site location including a second processor configured to execute:
an import background intelligent transfer service (BITS) configured to receive the one or more compressed files from the export BITS of the OSM data archival portion;
an import service configured to extract the monitoring data from one or more compressed files and send the extracted monitoring data to a central archiver, wherein the central archiver is configured to receive the monitoring data from the import service and to store the monitoring data for later access.

3. The system of claim 2, wherein the export BITS is configured to establish a secure asynchronous communication link to the import BITS of the central monitoring data archival portion.

4. The system of claim 2, wherein the import BITS, the import service, and the central archiver each comprise one or more threads configured to be executed on one or more processors in the central monitoring data archival portion.

5. The system of claim 2, wherein the central archiver comprises a database server, a file server, or a Proficy Historian archiver, and wherein the OSM archiver comprises a database server, a file server, or an iHistorian Data archiver.

6. The system of claim 2, wherein the export BITS and import BITS are configured to resume the respective sending and receiving of the one or more compressed files after an interruption.

7. The system of claim 1, wherein the portion of the monitoring data exported by the export service comprises the monitoring data for the machine over a specified time interval.

8. The system of claim 1, wherein the OSM archiver, the export service, and the BITS export service each comprise one or more threads configured to be executed on one or more processors in the OSM data archival portion.

9. The system of claim 1, wherein the export BITS is configured to download and use an updated configuration file when the updated configuration file is newer than a current configuration file.

10. The system of claim 1, wherein the machine comprises a turbine, a compressor, an air separation unit, a generator, or any combination thereof.

11. The system of claim 1, wherein the processor is configured to generate the data archive of the portion of the monitoring data collected over the first time interval when the time of execution is substantially equal to the expected time, and configured to generate the data archive of the portion of the monitoring data collected over the second time interval when the time of execution is substantially beyond to the expected time.

12. A method comprising:
monitoring the operation of one or more machines using one or more controllers;
storing monitoring data received from the one or more controllers in an on-site monitoring (OSM) archiver;
exporting a portion of the monitoring data from the OSM archiver into one or more compressed files, wherein exporting the portion of the monitoring data comprises executing one or more threads via a processor of the OSM archiver;
determining a time of execution for each of the one or more threads;
generating a data archive of the portion of the monitoring data collected over a first time interval or over a second time interval based at least in part on whether the time of execution corresponds to an expected time for exporting the portion of the monitoring data;
establishing an asynchronous communication channel to a central site; and
sending the one or more compressed files to the central site via the asynchronous communication channel.

13. The method of claim 12, comprising:
receiving the one or more compressed files at the central site via the asynchronous communication channel;
decompressing and parsing the compressed files to extract the monitoring data at the central site; and
storing the monitoring data in a central data archiver at the central site.

14. The method of claim 13, wherein the central data archiver comprises a database server, a file server, or an Proficy Historian Data archiver, and wherein the OSM archiver comprises a database server, a file server, or an iHistorian Data archiver.

15. The method of claim 13, comprising establishing a new asynchronous communication channel and resuming the sending and receiving of the one or more compressed archives via the new asynchronous communication channel when the asynchronous communication channel is lost.

16. The method of claim 12, wherein the asynchronous communication channel comprises a background intelligent transfer service (BITS) communication channel.

17. The method of claim 12, wherein exporting the portion of the monitoring data comprises exporting the monitoring data for operation of the machine over a specified time interval.

18. The method of claim 12, wherein the one or more machines comprise a turbine, a compressor, an air separation unit, a generator, or any combination thereof.

19. The method of claim 12, comprising receiving a regeneration (REGEN) request from a central monitoring data archival portion located at the central site, wherein the REGEN request comprises a request for the portion of the monitoring data collected over the second time interval when the time of execution does not correspond to the expected time for exporting the portion of the monitoring data.

20. A non-transitory, computer-readable medium storing instructions executable by a processor of one or more electronic devices, comprising:
instructions to spawn an export thread via the processor to package a portion of monitoring data for a machine from an on-site monitoring (OSM) archiver into one or more files;
instructions to determine a time of execution for the export thread;
instructions to generate a data archive of the portion of the monitoring data collected over a first time interval or over a second time interval based at least in part on whether the time of execution corresponds to an expected time for exporting the portion of the monitoring data and
instructions to establish an asynchronous background intelligent transfer service (BITS) communication channel and send the one or more files to a central site via the BITS communication channel.

21. The medium of claim 20, comprising:
instructions to receive the one or more files at the central site via the asynchronous background intelligent transfer service (BITS) communication channel;
instructions to unpack and parse the one or more files and to extract the monitoring data at the central site; and instructions to store the monitoring data in a central data archiver at the central site.

22. The medium of claim 21, comprising instructions to establish a new asynchronous communication channel and resume the sending and receiving of the one or more files via the new asynchronous communication channel when the asynchronous communication channel is lost.

23. The medium of claim 20, wherein the machine comprises a turbine, a compressor, an air separation unit, a generator, or any combination thereof.

* * * * *